US005130719A

United States Patent [19]

Nakase et al.

[11] Patent Number: 5,130,719

[45] Date of Patent: Jul. 14, 1992

[54] MOTOR-DRIVEN AUTOMOBILE ANTENNA

[76] Inventors: Kazuhiko Nakase, 1-22-17-506, Kitashinagawa, Shinagawa-ku, Tokyo; Yuzo Yamamoto, 3029-5, Asamizodai, Sagamihara-shi, Kanagawa, both of Japan

[21] Appl. No.: 587,516

[22] Filed: Sep. 24, 1990

Related U.S. Application Data

[63] Continuation of Ser. No. 285,048, Dec. 15, 1988, abandoned.

[51] Int. Cl.[5] ..................... H01Q 1/100; H01Q 1/320; H02P 1/220; H02P 3/080

[52] U.S. Cl. .................................... 343/903; 318/266; 318/468; 343/715

[58] Field of Search ............... 343/715, 900, 903, 901; 318/101, 264–266, 277, 369, 434, 466, 468–469, 626, 635, 650

[56] References Cited

U.S. PATENT DOCUMENTS 4,730,152 3/1988 Foust et al. ........................ 343/903

FOREIGN PATENT DOCUMENTS 2428674 1/1976 Fed. Rep. of Germany ...... 343/903
0264703 11/1987 Japan .
2187597 9/1987 United Kingdom ................ 343/903

*Primary Examiner*—Michael C. Wimer
*Assistant Examiner*—Peter Toby Brown

[57] ABSTRACT

A motor-driven antenna including a logic circuit for stopping a motor which drives a rod antenna to be extended and retracted. The logic circuit is activated when a voltage corresponding to an electric current of the antenna motor reaches a predetermined level.

2 Claims, 3 Drawing Sheets

MOTOR-DRIVEN AUTOMOBILE ANTENNA

This is a continuation of application Ser. No. 285,048, filed Dec. 15, 1988, now abandoned.

BACKGROUND OF THE INVENTION

1. Field of the Invention

The present invention relates to motor-driven antennas for automobiles.

2. Prior Art

In conventional motorized antennas for automobiles, a rack rope, attached to the lower end of a rod antenna, is moved in a vertical direction by gears which are driven by a motor. In addition, a clutch is used between the motor for driving the antenna and the rack rope in order to minimize damage to the rack rope and other components when the rod antenna is locked.

When the power of a radio is turned on, the motor for the antenna starts to rotate, and the rod antenna is extended gradually. When the antenna reaches its maximum length, it is mechanically locked. When the rod antenna is thus locked, the current in the motor increases. Based upon such an increased motor current level, locking of the antenna is detected. At this moment, the clutch is disengaged, thereby interrupting the electric current to the motor.

In the above-described conventional apparatus, locking of the antenna is detected based on the electric current which is constantly flowing to the motor. If the motor current increases over a predetermined level, it is detected that the antenna has reached the fully extended maximum length and locked, and accordingly the motor current is shut off.

In the above-described conventional antenna, the disengaged clutch idles when the antenna is locked. During this idling period, the electric current in the motor does not flow steadily, and it is difficult to accurately monitor the current. Consequently, during the idling period, the clutch produces "clicking" noise. Also, idling wears both the clutch and the rack rope, lowering the reliability of the entire antenna system.

SUMMARY OF THE INVENTION

In view of the above-described problems in conventional antennas, the present invention employs a logic circuit to stop the motor which drives a rod antenna. The logic circuit activates a motor stopping means when voltage corresponding to the electric current of the antenna motor reaches a predetermined level so that the antenna motor is stopped. Thus, the antenna motor is stopped almost simultaneously as the antenna is locked. Accordingly, clutch noise is not generated and abrasion of the rack rope etc. due to the idling of the clutch is avoided.

DETAILED DESCRIPTION OF THE INVENTION

Figure 2:
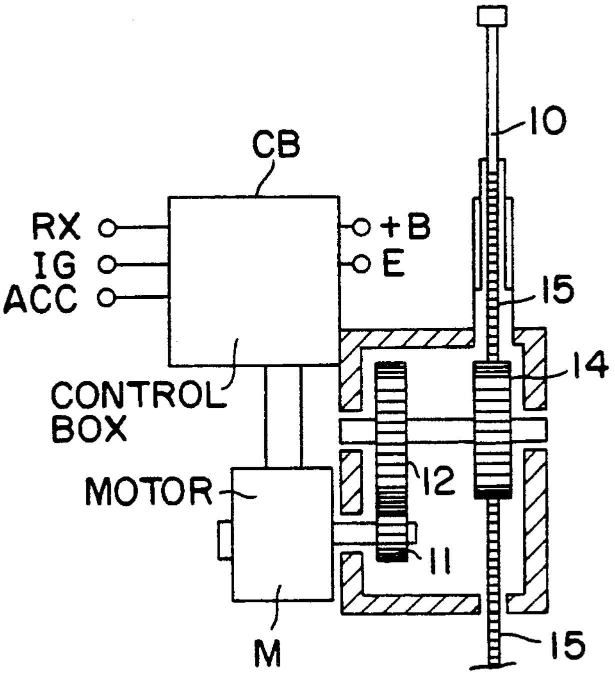
FIG. 2 is an explanatory diagram of the circuit of FIG. 1.

In FIG. 2, the lower end of the innermost periphery of a rod antenna 10 which can be freely extended or retracted is connected to the upper end of a rack rope 15 which is meshed with an antenna gear 14. In reality, the rack rope 15 is longer than shown in the Figure, and its lower section is omitted therein.

A motor gear 11, fixed on the rotating axle of a motor M, meshes with an intermediate gear 12, and this intermediate gear 12 is meshed with the antenna gear 14. A control box CB includes a control circuit which controls rotation of the motor M.

The rack rope 15 and the antenna gear 14 are described as an example of a mechanism which makes the rod antenna 10 move vertically, and the motor M is an example of a means which drives such a vertical motion mechanism.

Figure 3:
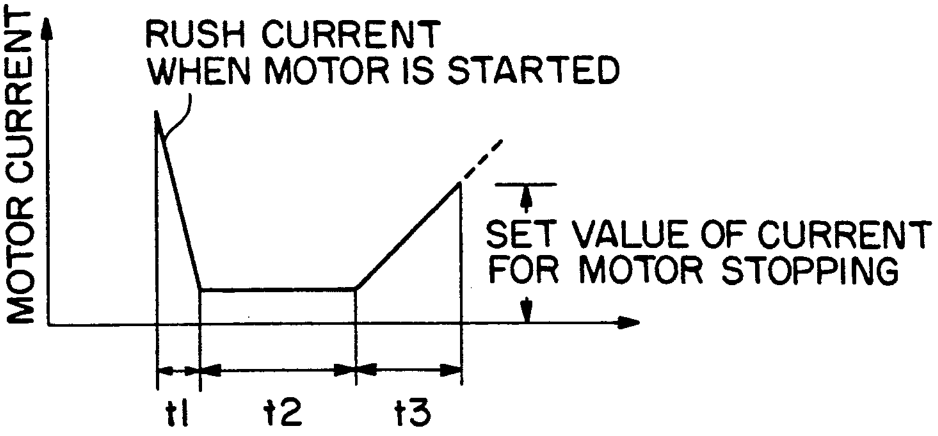
FIG. 3 shows changes in the motor current in the embodiment.

FIG. 3 shows the flow of electric current between the time of activation of the motor M and locking and stopping of operation of the motor M.

In FIG. 3, t1 is a period of time during which a rush current flows when the motor M starts rotating, t2 is a period of time during which the motor current is steady and the antenna being extended or retracted. Within the period of t3, the antenna 10 is locked, the motor current increases abruptly, and the motor current becomes 0 (zero) via a logic circuit which will be described later. The period t3 is shown to be longer than it actually is.

Figure 1:
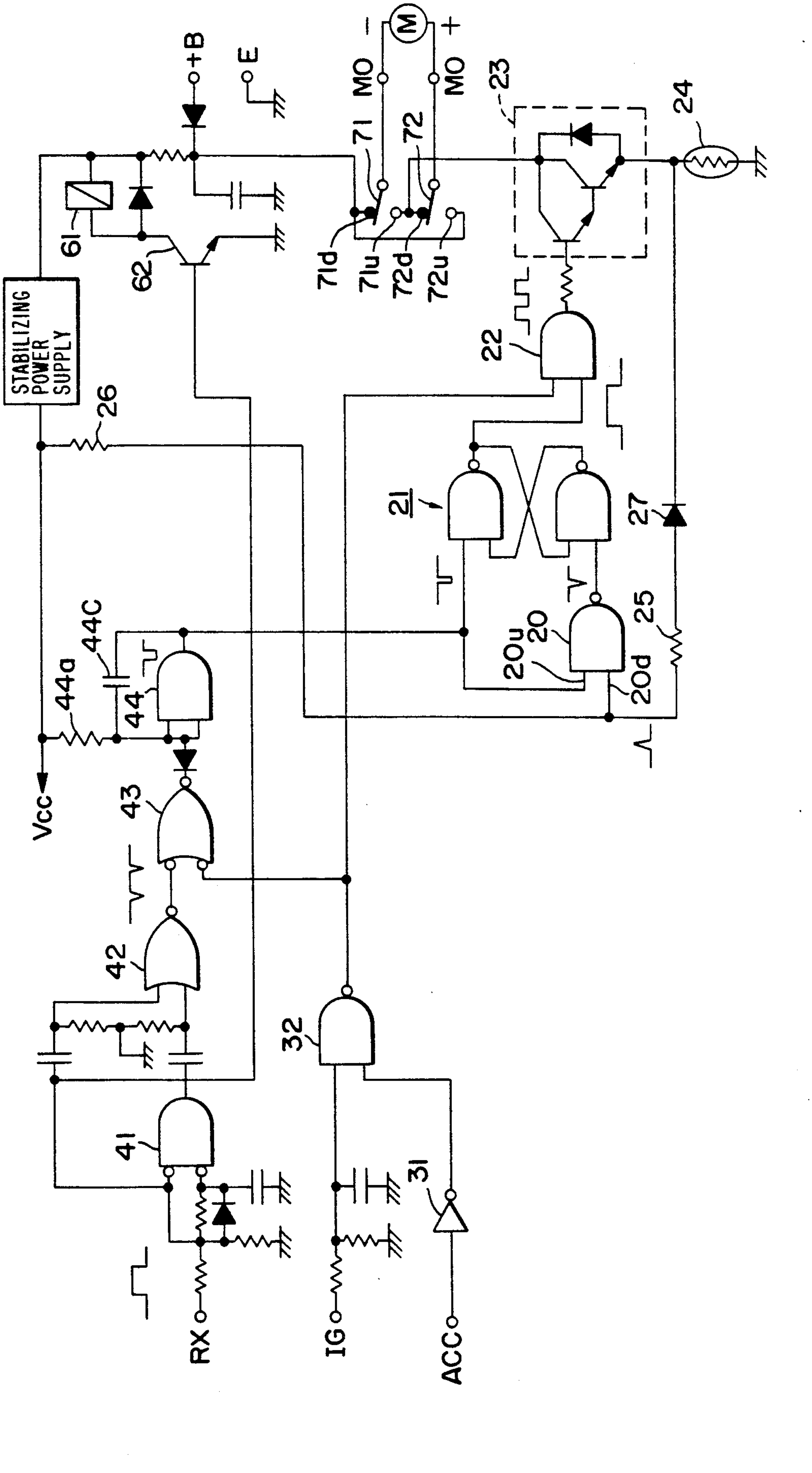
FIG. 1 shows an example of a control circuit in the application of the motor-driven automobile antenna of the present invention.

FIG. 1 shows an example of a control circuit provided in the control box CB. This control circuit includes a NAND gate 20, an R-S flip-flop 21, and an AND gate 22. The AND gate prevents a transistor block 23 from turning on. The transistor 23 drives the motor M. The control circuit further includes a positive temperature-resistance element 24 (hereinafter called "PTC") which is connected in series to the motor M. Resistors 25 and 26 in the control circuit are a voltage divider to adjust the bias at one of the input terminals of the NAND gate 20, and a diode 27 of the control circuit shifts the bias in a similar manner to those of the above mentioned resistors.

The transistor block 23 is described herein as an example of a motor stopping means, and the PTC 24 is a voltage generating means which generates voltage corresponding to the electric current of the motor M. Furthermore, the NAND gate 20 and flip-flop 21 is an example of a logic circuit which activates the motor stopping means so that the motor M is stopped when the voltage generated by the voltage generating means reaches a predetermined "threshold" level.

The control circuit is further provided with an inverter 31 which inverts signals from ACC, a NAND gate 32 which generates a signal "0" when the starter (ignition) is turned on, a gate 41, a NOR gate 42, and a gate 43.

The gate 41 has a delay function which causes a delay in signal changes from "0" to "1" and no delay in changes from "1" to "0". The gate 41 also has a signal inverting function. The NOR gate 42 outputs negative pulses at the moment when the power of a receiver unit RX is on and/or off. The gate 43 is a monostable multivibrator and generates negative pulses (pulses of signal "0") when the power of the receiver unit RX is turned on and/or off and at the start of operation of a starter. The pulse width of such negative pulse from the gate 43 is set at 0.1 second by a resistor 44*a* and a condenser 44*c* (this pulse width may be set at any desired level).

A transistor 62 activates a relay 61. Reference numerals 71 and 72 are contacts of the relay 61. When the relay 61 is excited, the contacts 71 and 72 make contact with terminals 7l*u* and 72*u*, respectively, the motor M rotates in a positive direction, and the rod antenna 10 is thus extended. When the relay 61 is not excited, the contacts 71 and 72 are connected to terminals 7l*d* and 72*d*, respectively, causing the motor M to rotate in a reverse direction and lower the rod antenna 10.

The operation of the above-described embodiment is explained below.

Figure 4:
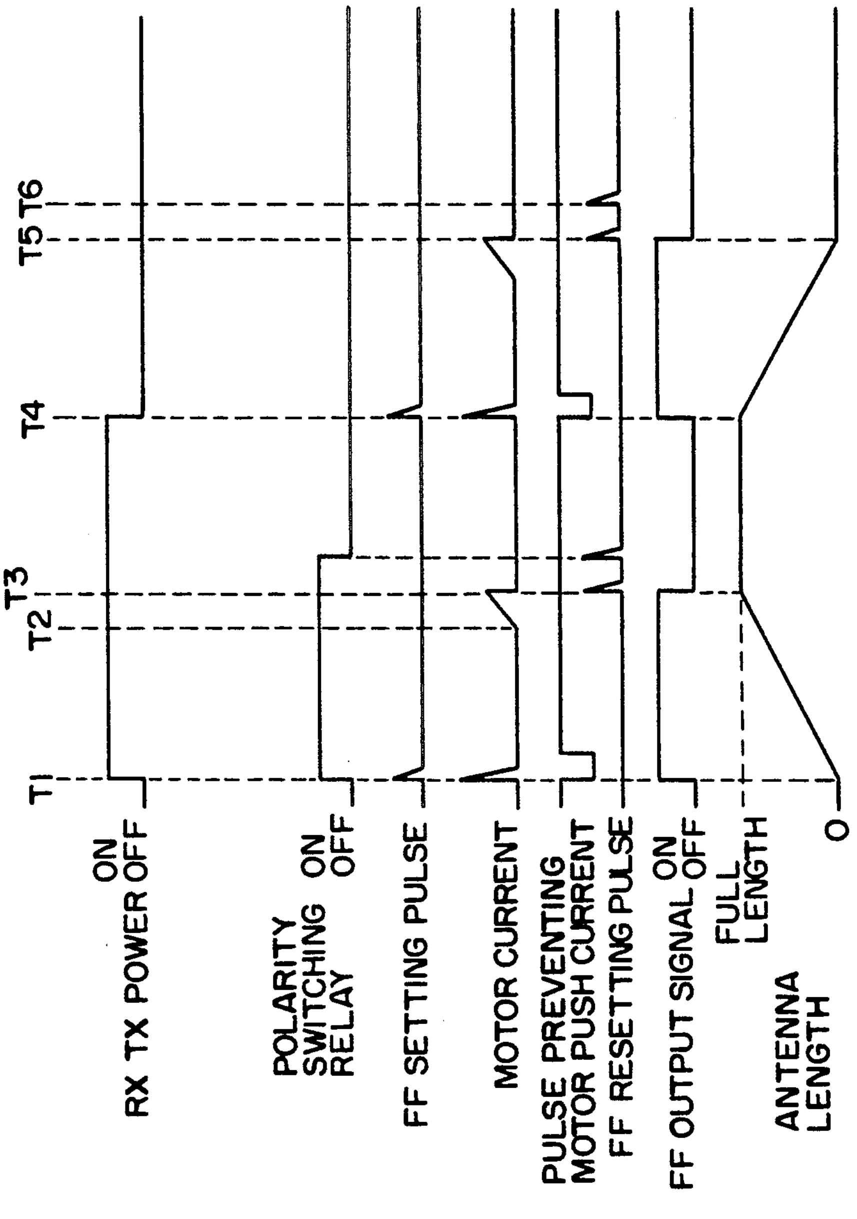
FIG. 4 is a time chart showing the actions of a rod antenna of the embodiment.

FIG. 4 is a time chart indicating the operation of the embodiment.

First, the power of the receiver unit RX is turned on at time T1, and the gates 42 and 43 generate negative pulses. Thus, the AND gate 44 generates negative pulses for 0.1 second. This causes the flip-flop 21 to be set, and the flip-flop 21 generates a positive signal. If the starter is not operating at this moment, the gate 32 outputs a positive signal, causing the AND gate 22 to output a positive signal. Thus, the transistor 23 is turned on, and the motor M starts to rotate. Since the power of the receiver unit RX is on, the transistor 62 is turned on, and the relay 61 is excited. Thus, the contacts 71 and 72 are connected to the terminals 7l*u* and 72*u*, respectively, the motor M rotates in a positive direction, and the rod antenna 10 starts to be extended.

When the motor M starts rotating, a rush current (a current generated during t1 as shown in FIG. 3) enters the motor M. At this moment, the voltage at both ends of the PTC 24 increases over a predetermined level, and the voltage at one terminal 20*d* of the NAND gate 20 exceeds the predetermined threshold level. Accordingly, though the NAND gate 20 tends to output a negative signal, since a negative pulse has already been applied to the other input terminal 20*u* for 0.1 second, the NAND gate 20 does not output a negative signal, and the flip-flop 21 is not reset.

In this way, the rod antenna 10 is slowly extended. In other words, the motor M continues to rotate in a positive direction (for the period t2 as shown in FIG. 3). When the rod antenna 10 is extended near its maximum (at T2 of FIG. 4), the antenna gear 14 stops, the intermediate gear 12 and motor gear 11 as well as the motor M stop, and the motor current abruptly increases (during the period t2 of FIG. 3). The time period from the point T2 to the point T3 in FIG. 4 in reality is much shorter than indicated therein. In other words, T2 shifts to T3 instantaneously.

The above-described voltage exceeds the predetermined level at T3 of FIG. 4, and the voltage at the input terminal 20*d* of the AND gate (logic) 20 exceeds the threshold level. At this moment, a positive signal is applied to the input terminal 20*u* of the AND gate 20, which outputs a negative signal, and thus the flip-flop 21 is reset.

As a result, the AND gate 22 outputs a negative signal, and the transistor block 23 is turned off. Thus, the motor M stops.

More specifically, when the voltage generated at both ends of the PTC 24 reaches a predetermined threshold level, the logic circuit immediately activates the motor stopping means to stop the motor M. Accordingly, stress to the rack rope 15 is small, and the rack rope 15 is not likely to be damaged. Also, since a clutch is not necessary, no clutch noise is generated.

If the power of the receiver unit RX is turned off thereafter (at T4 in FIG. 4), the gate 43 generates a negative pulse, and for 0.1 second following the generation of this negative pulse, the gate 44 generates a negative pulse. As a result, the flip-flop 21 is set again, turning on the transistor block 23. At this moment, since the power of the receiver unit RX is off and the gate 41 outputs a negative signal, the transistor 62 is turned off, and the relay 61 is not excited. Thus, the contacts 71 and 72 remain connected to the terminals 71*d* and 72*d*, respectively, and the motor M rotates in a reverse direction. As a result, the rod antenna 10 is gradually retracted.

When the rod antenna 10 approaches the minimum length (at T5 in FIG. 4), the antenna gear 14 is mechanically locked. At this moment, the intermediate gear 12 and motor gear 11 and the motor M are stopped, and the current flowing to the motor M abruptly increases and the voltage at both ends of the PTC 24 is also abruptly increased. When the voltage at these ends exceeds the predetermined level (at T6 of FIG. 4), the NAND gate 20 generates a negative pulse, the flip-flop 21 is reset, the transistor block 23 is turned off, and the motor M stops. The period of time shifting from T5 to T6 in FIG. 4 is in fact very much shorter than described, i.e. shifts instantaneously from T5 to T6.

When the antenna 10 is locked, the logic circuit immediately activates the motor stopping means to stop the motor M. Thus, the rack rope 15 is not damaged and no noise occurs.

The resistors 25 and 26 for providing a bias voltage, improve the sensitivity of the logic circuit. In addition, the diode 27 improves the sensitivity of the logic circuit further, and with the diode, the logic circuit can work even if the resistance value of the PTC 24 is very small.

If the starter is turned on while the rod antenna 10 is being extended or retracted, the gate 32 generates a negative pulse. Thus, the gate 22 outputs a negative signal, the transistor block 23 is turned off, and the motor M, which is rotating, is stopped.

When the starter is turned off, the AND gate 22 generates a positive signal. Thus, the transistor block 23 is turned on, the motor M continues to rotate, and the rod antenna 10 continues to be extended or retracted. At this moment, since the multi-vibrator 44 generates a negative pulse for approximately 0.1 second, the flip-flop 21 is set again and, as described above, the transistor block 23 is turned on, the motor M rotates, and the rod antenna 10 is extended or retracted. In other words, when the power of the receiver unit RX is on or off, the rod antenna 10 is extended or retracted.

As described above, according to the present invention, the motor is stopped almost simultaneously with locking of the antenna. Thus, a clutch, which is required in conventional antennas, is no longer necessary, and clutch noise can be eliminated. Also, undue wear of the rack rope caused by the idling of the clutch does not occur.

We claim:

1. A motor driven antenna for automobiles wherein said motor driven antenna is powered by a voltage source, said motor driven antenna comprising:

- a vertical driving means for driving a rod antenna in a vertical direction;
- a motor which drives said vertical driving means, said motor being coupled to said voltage source;
- a positive temperature coefficient resistor of a very small resistance value in series with said motor and said voltage source for generating a voltage corresponding to an electric current of said motor;

a power transistor having base, collector and emitter terminals, said collector and emitter terminals being connected in series with said motor and said positive temperature coefficient resistor, said power transistor for turning said motor off in response to a trigger pulse applied to said base terminal;

a logic circuit for generating said trigger pulse to said base terminal of said power transistor for turning said motor off when a voltage at an input of said logic circuit reaches a predetermined value;

a voltage dividing means coupled across said voltage source and to said input of said logic circuit for providing a biasing voltage to said input of said logic circuit, said voltage dividing means being coupled to said positive temperature coefficient resistor such that said voltage of said positive temperature coefficient resistor and said biasing voltage are applied to said input of said logic circuit; and a diode coupled between said voltage dividing means and said positive temperature coefficient resistor;

whereby the sensitivity of said logic circuit to an increasing current in said motor is improved.

2. A motor driven antenna according to claim 1, wherein said diode is provided such that a cathode of said diode is coupled to said positive temperature coefficient resistor and an anode of said diode is coupled to said voltage dividing means.

* * * * *

UNITED STATES PATENT AND TRADEMARK OFFICE
CERTIFICATE OF CORRECTION

PATENT NO. : 5,130,719
DATED : July 14, 1992
INVENTOR(S) : KAZUHIKO NAKASE et al.

It is certified that error appears in the above-identified patent and that said Letters Patent is hereby corrected as shown below:

On title page, item

[73] Assignee: Add --Harada Kogyo Kabushiki Kaisha, Tokyo, Japan--

Signed and Sealed this

Sixteenth Day of November, 1993

Attest:

BRUCE LEHMAN

*Attesting Officer*

*Commissioner of Patents and Trademarks*